United States Patent
Iseki

(10) Patent No.: US 6,324,730 B1
(45) Date of Patent: Dec. 4, 2001

(54) WEBBING INSERTION MEMBER

(75) Inventor: Hideo Iseki, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/550,070

(22) Filed: Apr. 14, 2000

Related U.S. Application Data

(63) Continuation-in-part of application No. 09/375,800, filed on Aug. 17, 1999, now Pat. No. 6,138,328.

(30) Foreign Application Priority Data

Aug. 27, 1998 (JP) .................................................. 10-241880

(51) Int. Cl.⁷ ..................................................... A44B 11/00
(52) U.S. Cl. ....................... 24/197; 24/265 BC; 280/808; 280/801.1
(58) Field of Search ........................ 24/265 BC, 265 EC, 24/197; 280/808, 801.1

(56) References Cited

U.S. PATENT DOCUMENTS

| | | | |
|---|---|---|---|
| 4,211,432 | * | 7/1980 | Furukawa et al. .................... 280/808 |
| 4,369,931 | * | 1/1983 | Föhl ................................. 280/808 X |
| 4,527,313 | * | 7/1985 | Sylven et al. ................ 24/265 BC X |
| 4,582,340 | * | 4/1986 | Föhl ..................................... 280/808 |
| 5,513,880 | * | 5/1996 | Ohira et al. .......................... 280/808 |
| 5,601,311 | * | 2/1997 | Pfeiffer et al. ..................... 280/801.1 |
| 5,609,367 | * | 3/1997 | Eusebi et al. ........................ 280/808 |
| 5,768,753 | * | 6/1998 | Möndel ........................... 24/265 BC |
| 5,918,903 | * | 7/1999 | Ito ...................................... 280/801.1 |
| 6,217,070 | * | 4/2001 | Kopetzky et al. .................... 280/808 |

* cited by examiner

*Primary Examiner*—Robert J. Sandy
(74) *Attorney, Agent, or Firm*—Kanesaka & Takeuchi

(57) ABSTRACT

A webbing insertion member is formed of a body having a through opening for allowing a webbing to pass therethrough, and a slide portion formed on at least one side of the through opening. The slide portion has a rough portion substantially contacting the webbing to reduce a sliding area with the webbing. A friction reducing material is formed on the rough portion for allowing the webbing to slide easily and smoothly on the rough portion.

6 Claims, 2 Drawing Sheets

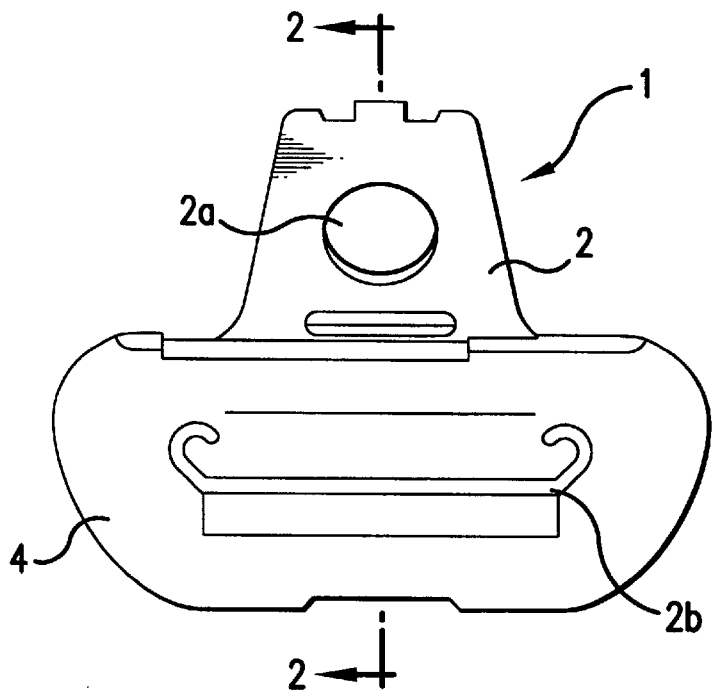
FIG.1
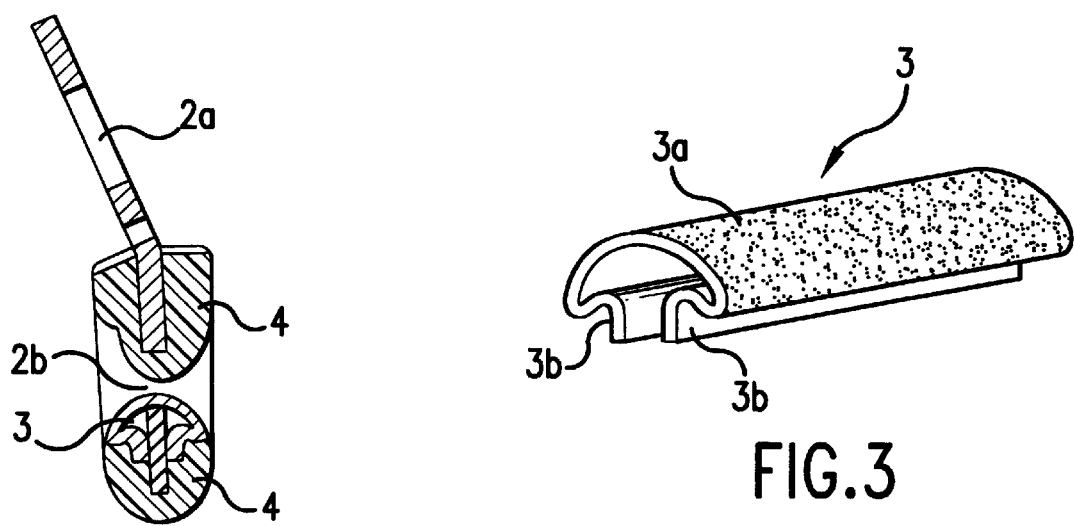
FIG.2
FIG.3

WEBBING INSERTION MEMBER

CROSS-REFERENCE TO RELATED APPLICATION

This is a continuation in part application of U.S. patent application Ser. No. 09/375,800 filed on Aug. 17, 1999 now U.S. Pat. No. 6,138,328.

BACKGROUND OF THE INVENTION AND RELATED ART STATEMENT

The present invention relates to a webbing insertion member used for, such as deflection fitting or shoulder anchor, in a seat belt device.

Seat belt devices are used in high-speed vehicles, such as automobiles and aircraft, for protecting occupants by means of webbings thereof. For example, as for a seat belt device for a front seat of an automobile, the webbing is hooked by a deflection fitting or shoulder anchor disposed on a frame or B pillar of the automobile.

The deflection fitting is normally formed by insert molding so that a metal body as a metal insert is covered with a mold made of synthetic resin (normally, polyamide).

The deflection fitting or shoulder anchor is provided with a webbing through opening. Surfaces on which the webbing slides are made of the aforementioned synthetic resin, so that frictional resistance in sliding the webbing is large.

It is an object of the present invention to provide a webbing insertion member allowing smooth sliding of the webbing.

Another object of the invention is to provide a webbing insertion member as stated above, wherein the webbing can be easily handled by a user.

Further objects and advantages of the invention will be apparent from the following description of the invention.

SUMMARY OF THE INVENTION

A webbing insertion member according to the present invention is formed of a body having a through opening for allowing a webbing to pass therethrough, a slide portion formed on at least one side of the through opening, and a friction reducing material formed on the slide portion. The slide portion has a rough portion at a sliding area substantially contacting the webbing to reduce a contact area with the webbing. The friction reducing material is formed on the rough portion for allowing the webbing to slide easily on the rough portion.

The rough portion includes a plurality of very small projections, and/or very small projections and grooves (dents) on the surface of the slide portion. Preferably, the projections have ten-point mean roughness between 7 and 17 $\mu$m, and an average distance between 150 and 350 $\mu$m. It is preferable that the low frictional material is a coating of solid lubricant and/or metal plating.

In the invention, since the rough portion is formed on the slide portion, the contact area with the webbing on the slide portion is reduced, on which the friction reducing material is applied. Since the friction reducing material is formed on the reduced contact area, the sliding ability of the webbing is increased. The webbing can slide smoothly through the through opening.

The slide portion may be formed of a metal slip piece to be fixed to the body adjacent the through opening. The slip piece has a curved portion having the rough portion, and legs for holding the body therebetween. On the other hand, the slide portion may be formed integrally with the body made of metal, and have an outwardly curved surface facing the through opening, on which the rough portion is formed. The solid lubricant and/or metal plating is formed on the slide portion.

BRIEF DESCRIPTION OF THE DRAWINGS

FIG. 1 is a front view of a deflection fitting or shoulder anchor as a webbing insertion member according to a first embodiment of the invention;

FIG. 2 is a sectional view taken along line 2—2 in FIG. 1;

FIG. 3 is a perspective view of a slip piece used in the webbing insertion member shown in the first embodiment;

DETAILED DESCRIPTION OF PREFERRED EMBODIMENTS

Figure 4:
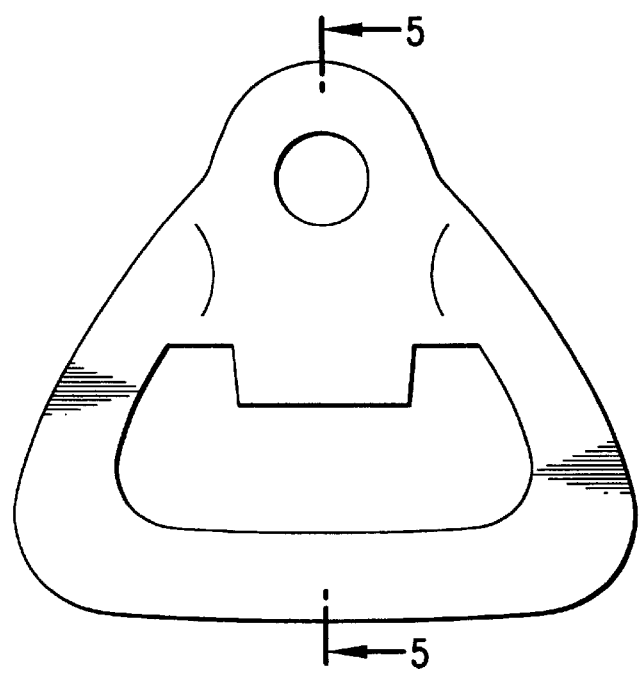
FIG. 4 is a front view of a webbing insertion member according to a different embodiment of the invention.

FIG. 1 is a front view of a deflection fitting or shoulder anchor as a webbing insertion member according to an embodiment; FIG. 2 is a sectional view taken along line 2—2 in FIG. 1; and FIG. 3 is a perspective view of a slip piece.

A deflection fitting or shoulder anchor 1 comprises a plate type body 2 made of metal, a slip piece 3 engaging the body 2, and a synthetic resin mold 4.

Formed in an upper portion of the body 2 is a bolt through hole 2a for fixing the deflection fitting 1 to a frame or B pillar. Formed in a lower portion of the body 2 is a webbing through opening 2b.

The slip piece 3 is made of a metal plate by press working to have a curved portion 3a and a pair of parallel legs 3b. The edge of the webbing through opening 2b of the body is clamped between the parallel legs 3b.

The curved portion 3a has an outer surface constituting a contact area with a webbing (not shown). The outer surface has a rough face, i.e. very small projections and dents. Namely, a shot-blast processing is applied onto a relatively smooth metal surface of the slip piece 3 such that surface roughness of Rz (ten-point mean roughness) is 7–17 $\mu$m, preferably 10–13 $\mu$m, and the average distance between the projections is 150–350 $\mu$m, preferably 200–300 $\mu$m. Instead of the shot-blast processing, sand blast processing, barrel grinding or melting of a surface of the curved portion may be employed.

Formed on the outer surface of the curved portion 3a of the slip piece 3 is a layer of a low friction material, i.e. friction reducing material. Examples of the layer of the low friction material include fluororesin, e.g. tetrafluoroethylene, coating, nickel plating, chrome plating, boron plating, and besides the above, ceramic coatings, such as molybden disulfide coating, tungsten disulfide coating, boron nitride coating, and fluoride graphite coating. Forming such a coating or plating having excellent solid lubricity provides quite smooth sliding for the webbing. It should be noted that the curved portion 3a may have a plurality of layers of plating, or may have one or more layers of coatings on the layer of plating.

Such a layer of excellent solid lubricity may be formed on the surface of the synthetic resin mold 4.

In forming the deflection fitting, the slip piece 3 having the shape shown in the drawing is prepared, and is processed to have the rough surface. Thereafter, the layer of the low friction material is applied onto the rough surface. Then, the slip piece 3 is engaged with the webbing through opening 2b of the body 2, wherein the legs 3b sandwich a part of the body 2. Finally, the insert molding is conducted to form the synthetic resin mold 4, thereby making the deflection fitting. The synthetic resin may be polyamide, such as nylon.

Figure 5:
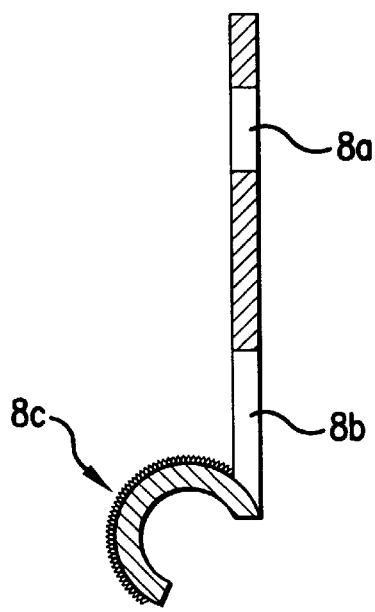
FIG. 5 is a sectional view taken along line 5—5 in FIG. 4.

FIG. 4 is a front view of a webbing insertion member 8 according to a different embodiment, and FIG. 5 is a sectional view taken along line 5—5 in FIG. 4.

The webbing insertion member 8 is generally made of a metal plate, and has a bolt through hole 8a and a webbing through opening 8b. The portion under the webbing through opening 8b is curved by press working to have a curved portion 8c having a C-like section. The surface of the curved portion 8c is processed to have a rough surface including projections and dents. Then, a plating or coating layer having excellent solid lubricity is applied over the entire rough surface of the curved portion.

Though the aforementioned embodiments relate to the deflection fitting or shoulder anchor, the present invention may be applied to a tongue of a seat belt device.

In the invention, since the rough portion is formed on the slide portion, the contact area with the webbing on the slide portion is reduced, on which the friction reducing material is applied. Since the friction reducing material is formed on the reduced contact area, the sliding ability of the webbing is increased.

Generally, the webbing has a resin coating. When the webbing contacts the webbing insertion member, the resin coating on the webbing may be gradually transferred to the sliding portion of the webbing insertion member, which reduces the sliding ability of the webbing. However, in the invention, since the contact area with the webbing is reduced, such unfavorable transfer of the resin from the webbing is reduced significantly. The webbing can slide smoothly through the through opening.

As described above, according to the webbing insertion member of the present invention, the efficiency of sliding of the webbing is improved significantly.

While the invention has been explained with reference to the specific embodiments of the invention, the explanation is illustrative and the invention is limited only by the appended claims.

What is claimed is:

1. A webbing insertion member comprising:
   a body having a through opening for allowing a webbing to pass therethrough,
   a slide portion formed on at least one side of the through opening of the body, said slide portion being formed of a metal slip piece to be fixed to the body near the through opening and having a curved portion with a rough portion for substantially contacting the webbing to reduce a sliding area with the webbing, said rough portion including a plurality of small projections and dents, and legs for holding the body, and
   a friction reducing material formed on the rough portion for allowing the webbing to slide easily and smoothly on the rough portion.

2. A webbing insertion member according to claim 1, further comprising a resin for covering the body around the through opening and legs of the slip piece to combine the body and the slip piece.

3. A webbing insertion member according to claim 1, wherein said projections have ten-point mean roughness between 7 and 17 $\mu$m.

4. A webbing insertion member according to claim 3, wherein said friction reducing material is at least one member selected from a group consisting of a coating of solid lubricant and metal plating.

5. A webbing insertion member comprising:
   a body made of metal and having a through opening for allowing a webbing to pass therethrough,
   a slide portion formed on at least one side of the through opening of the body, said slide portion being integrally formed with the body and having an outwardly curved surface facing the through opening, and a rough portion formed on the curved surface for substantially contacting the webbing to reduce a sliding area with the webbing, said rough portion including a plurality of small projections and dents, and
   a friction reducing material formed on the rough portion for allowing the webbing to slide easily and smoothly on the rough portion.

6. A webbing insertion member according to claim 5, wherein said projections have ten-point mean roughness between 7 and 17 $\mu$m.

* * * * *